(12) United States Patent
Cassiman et al.

(10) Patent No.: US 9,759,337 B2
(45) Date of Patent: Sep. 12, 2017

(54) EASY-CONNECT ATTACHMENT HEAD AND ADAPTER

(71) Applicant: Pacific Cycle, LLC, Madison, WI (US)

(72) Inventors: Ian Cassiman, Cottage Grove, WI (US); Jesse C. Darley, Madison, WI (US); Brian Koons, Middleton, WI (US); Randall S. Koplin, Middleton, WI (US); Jeffrey Allen Rogers, Milford, NJ (US); Jeff R. Staszak, Deerfield, WI (US); Joseph J. Werwie, III, Sun Prairie, WI (US)

(73) Assignee: Pacific Cycle, LLC, Madison, WI (US)

( * ) Notice: Subject to any disclaimer, the term of this patent is extended or adjusted under 35 U.S.C. 154(b) by 364 days.

(21) Appl. No.: 14/245,117

(22) Filed: Apr. 4, 2014

(65) Prior Publication Data
US 2014/0305519 A1 Oct. 16, 2014

Related U.S. Application Data

(60) Provisional application No. 61/810,517, filed on Apr. 10, 2013.

(51) Int. Cl.
*F16K 15/20* (2006.01)
*B60C 29/06* (2006.01)
*F04B 33/00* (2006.01)

(52) U.S. Cl.
CPC ............ *F16K 15/20* (2013.01); *B60C 29/06* (2013.01); *F04B 33/005* (2013.01); *Y10T 137/7069* (2015.04); *Y10T 137/85978* (2015.04); *Y10T 137/9029* (2015.04)

(58) Field of Classification Search
CPC ........ F16K 15/20; B60C 29/06; F04B 33/005; Y10T 137/7069; Y10T 137/85978; Y10T 137/9029; Y10T 137/3584; Y10T 137/3724; F16L 37/1215
USPC ......................................... 137/223, 231, 270
See application file for complete search history.

(56) References Cited

U.S. PATENT DOCUMENTS

| | | | |
|---|---|---|---|
| 484,509 A | 10/1892 | Schrader | |
| 1,500,531 A * | 7/1924 | Schweinert | B60C 29/064 285/34 |
| 1,974,476 A * | 9/1934 | Wahl | F16L 37/12 137/614.04 |
| 2,263,293 A * | 11/1941 | Ewald | F16L 37/0841 251/149.6 |
| 4,357,037 A * | 11/1982 | Oetiker | F16L 37/086 285/314 |
| 8,366,648 B2 * | 2/2013 | Sanna | A61M 39/1011 604/4.01 |
| 8,720,475 B2 * | 5/2014 | Wu | F04B 33/00 137/223 |
| 9,249,914 B2 * | 2/2016 | Kuo | F16L 37/28 |
| 2005/0000568 A1 * | 1/2005 | Nikolayev | F16L 37/23 137/231 |

(Continued)

*Primary Examiner* — Craig J Price
(74) *Attorney, Agent, or Firm* — Brian G. Gilpin; Godfrey & Kahn, S.C.

(57) ABSTRACT

An adapter connects to a valve to convert the valve to a uniform configuration for connection to a pump. In one application, a conventional Schrader or Presta valve has an adapter to convert the valve to a uniform configuration for connection to a pump. An attachment head of a pump engages and creates a seal with the adapter and has a release mechanism to disengage the attachment head from the adapter.

4 Claims, 16 Drawing Sheets

(56) References Cited

U.S. PATENT DOCUMENTS

2008/0190489 A1* 8/2008 Wrubel .............. F16L 37/1215
                                                    137/231
2013/0291976 A1* 11/2013 Chang .................... F16L 37/23
                                                    137/798

* cited by examiner

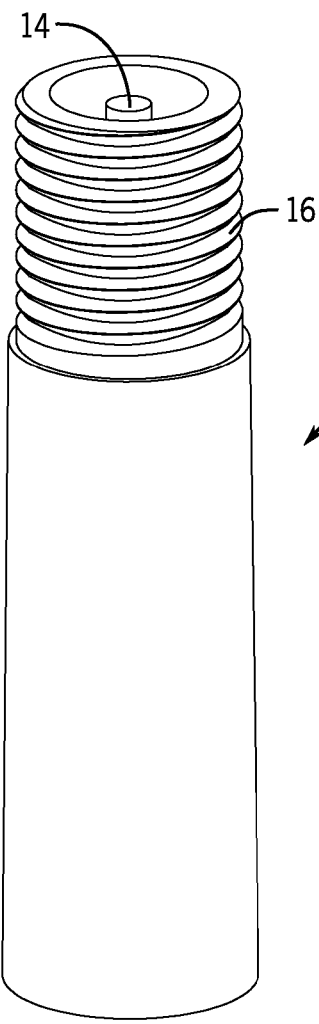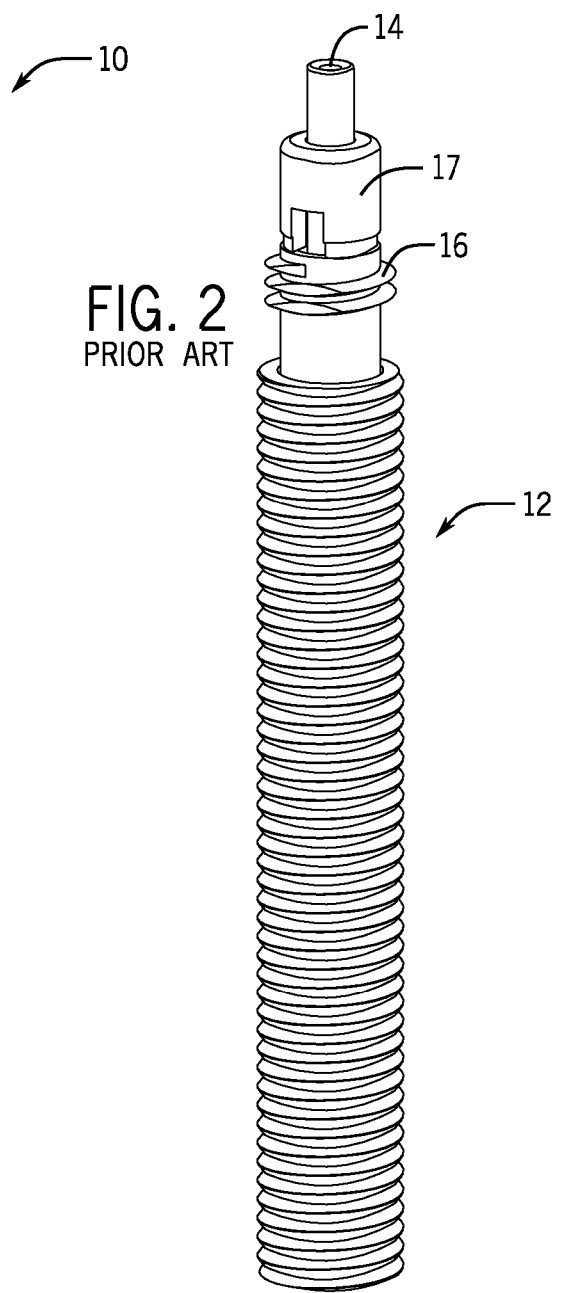

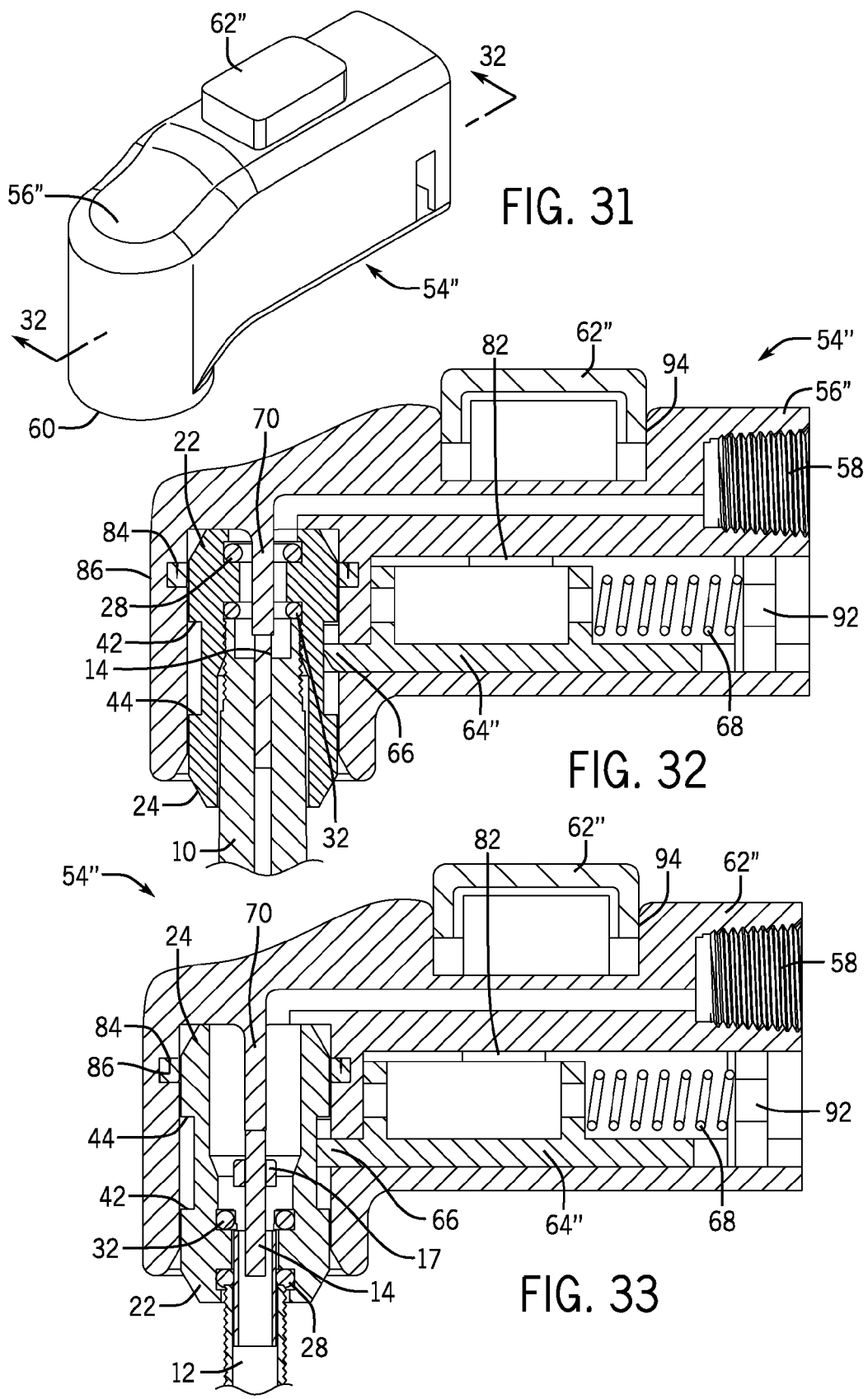

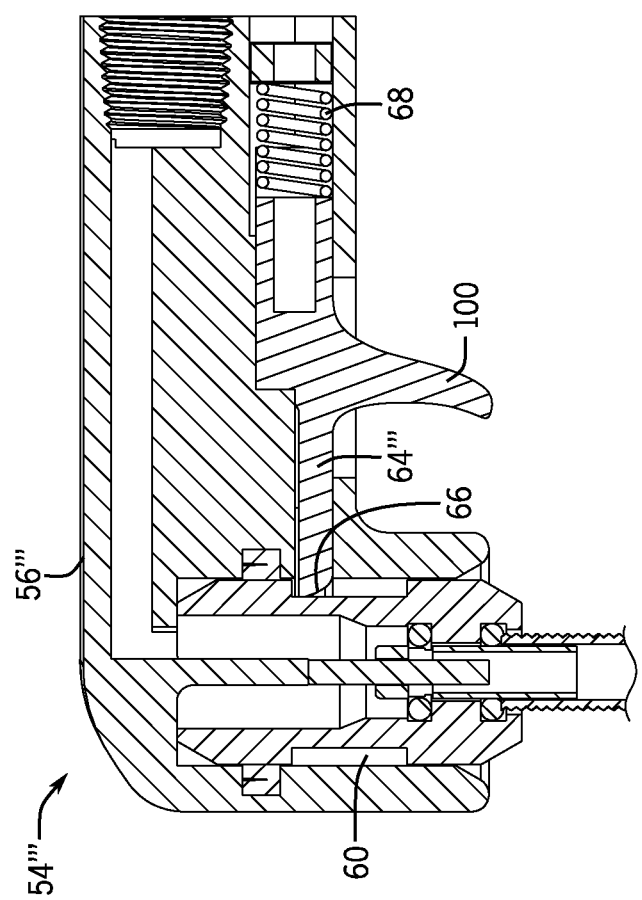

EASY-CONNECT ATTACHMENT HEAD AND ADAPTER

CROSS REFERENCE TO RELATED APPLICATIONS

This application claims the benefit of U.S. Provisional Patent Application Ser. No. 61/810,517, filed Apr. 10, 2013, the disclosure of which is hereby incorporated by reference herein in its entirety for all purposes.

FIELD OF THE INVENTION

The present invention relates generally to the field of air sources, such as, but not limited to air pumps and compressors. More particularly, the present invention relates to the field of valve connectors for such air sources.

BACKGROUND

There are many objects that require or are better utilized when inflated. Some examples of such objects include, but are not limited to, vehicles, bicycles and inflatable toys. To inflate such objects, an air source is connected to a valve of the object to be inflated. There exist many different valve types often depending on the origin of the object or type of object to be inflated. One such example is in the bicycle industry.

The most common types of bicycle tire valves are the Schrader valve 10 (also known as the "American" and shown in U.S. Pat. No. 484,509 issued in 1892), shown in FIG. 1, and the Presta valve 12 (also known as the "Sclayerand" or "French") shown in FIG. 2, which permit the introduction or elimination of air in a tire. Each of the Schrader valve 10 and Presta valve 12 have a pin 14 that must be depressed in order to permit air to flow into or out of the tire and a thread 16 for retaining a cap (not shown). The Presta valve 12 additionally requires that a nut 17 be at least partially unscrewed so that the pin can be depressed. Other valve types are known in the bicycle industry, for example Dunlop (also known as the "Woods" or "English") and Regina, but are less commonly used. Keeping track of which valve type is used on each object, or even each bicycle, can be difficult and can result in the need to try a number of different valve connectors or repeated trips to a workbench or store to find a different valve connector. Therefore, a need exists for an air source to be able to connect to many different, or at least the most common valve types.

Many current valve connectors for air supplies rely on the user to correctly connect the valve connector to the valve of the object to be inflated and to create a proper seal. For example, when using an air compressor at a gas station, the user is required to move and wiggle the valve connector of the air compressor on the valve for a vehicle or bicycle tire until a seal is formed. Because the valve connector for the air compressor is larger than the tire valve, there is nothing to guide the user to make a seal.

By way of another example, some hand air pumps have a valve connector with a handle that is used to secure the valve connector to a valve. Although such connectors can help hold the valve connector on the valve, such connectors provide no guide for the user to ensure a proper seal is made. Therefore, the valve connector will still often need to be moved around and re-seated, requiring the handle to be unlatched and re-latched until a seal is formed. Those who less frequently use such a valve connector may forget to lock the handle all together until he or she realizes there is no air entering the valve.

Further, the handle can be difficult to fully latch. Many such handle valve connectors use camming action, which requires greater and greater force until the handle is latched. A similarly large amount of initial force is then required to unlatch the handle. This can be difficult for children or those with physical hand limitations such as arthritis.

Positioning a handle valve connector on a valve and latching the handle in a tight space such as in between narrow spokes on a bicycle tire or when the stem of the valve is out of proper alignment can also prove difficult and frustrating. Similarly frustrating can be when trying to use force to latch the handle of a valve connector on the valve of a deflated tire, such as a bicycle tire, without pushing the valve into the tire itself or under the rim of the wheel. Therefore, a need exists for a valve connector which latches onto a valve and forms a seal without reliance on a user and requires little force to attach and remove from a valve. Embodiments of the following invention solve certain problems in existing air source connection devices and provide some or all of the foregoing benefits.

SUMMARY OF THE INVENTION

In one embodiment, the invention provides an adapter and an attachment head. The adapter includes a first open end to engage a valve, a second end and an exterior edge. The attachment head includes a port configured such that at least the second end of the adapter fits within the port, a lock mechanism slideably held by the attachment head and biased to have an end extend into the port, and a release mechanism for withdrawing the lock mechanism from the port. When the second end of the adapter is inserted into the port, the lock mechanism engages the exterior edge of the adapter and holds the adapter within the port. When the release mechanism is activated, the lock mechanism is withdrawn from the port and disengaged from the exterior edge.

In another embodiment, the invention provides an air delivery assembly with a nozzle having a dock and a release switch and a hollow member. The hollow member has a first end shaped to receive a valve and a second end shaped to engage the dock. When the second end engages the dock, the hollow member is retained by the nozzle. When the release switch is employed, the hollow member is released from the nozzle.

In another embodiment, the invention provides a pump having an adapter and an attachment head. The adapter includes a first and second open end, an internal passage and an external shape. The first open end has an interior portion shaped to connect to a valve and an exterior. The second open end has an interior portion shaped to connect to a valve and an exterior. The internal passage connects the first open end to the second open end. The external shape has at least one engagement rim. The attachment head includes a port, a slide plate, a release button and an internal conduit. The port is shaped to receive the exterior of at least one of the first open end and second open end. The slide plate has an arm urged into the port by a spring and an angled portion. The release button has a projection for engaging the angled portion to withdraw the arm from the port. The internal conduit provides the attachment head with an air supply. When at least one of the first open end and second open end is received in the port, the arm engages the at least one engagement rim of the adapter to hold the adapter within the port. When the release button is depressed to withdraw the arm from engagement with the at least one engagement rim of the adapter, the adapter is released from the port.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 1 shows a side perspective view of a prior art Schrader valve;

FIG. 2 shows a side perspective view of a prior art Presta valve;

FIG. 31 is a perspective view of an alternative embodiment of an attachment head in accordance with the invention;

FIG. 32 is a cross-section of the attachment head from FIG. 31 taken along the line 32-32 in FIG. 31, shown engaged with an adapter connected to a Schrader valve;

FIG. 33 is a cross-section of the attachment head from FIG. 31 taken along the line 32-32 in FIG. 31, shown engaged with an adapter connected to a Presta valve;

FIG. 35 is a cross section of another attachment head in accordance with the invention.

DETAILED DESCRIPTION

An adapter for a valve in accordance with the present invention converts a variety of different valve types to a uniform valve type that can be correctly sealed with and easily engaged and disengaged from an attachment head. An attachment head in accordance with the present invention enters into an engaged position with a valve and can be easily released from a valve such as by use of a release trigger.

Figure 3:
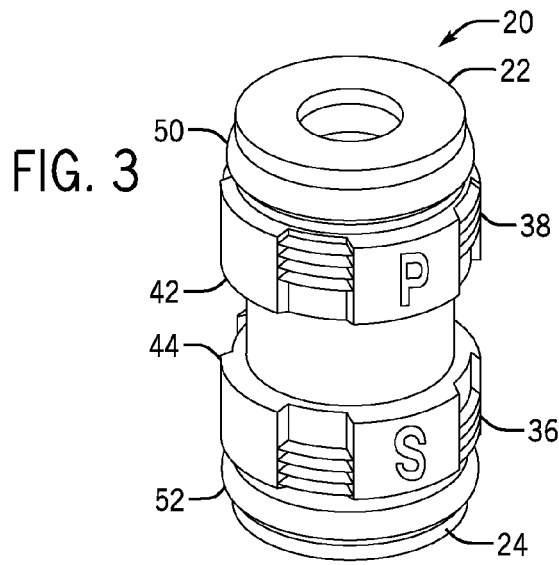
FIG. 3 is a side perspective view of an adapter in accordance with one embodiment of the invention.
Figures 4, 5:
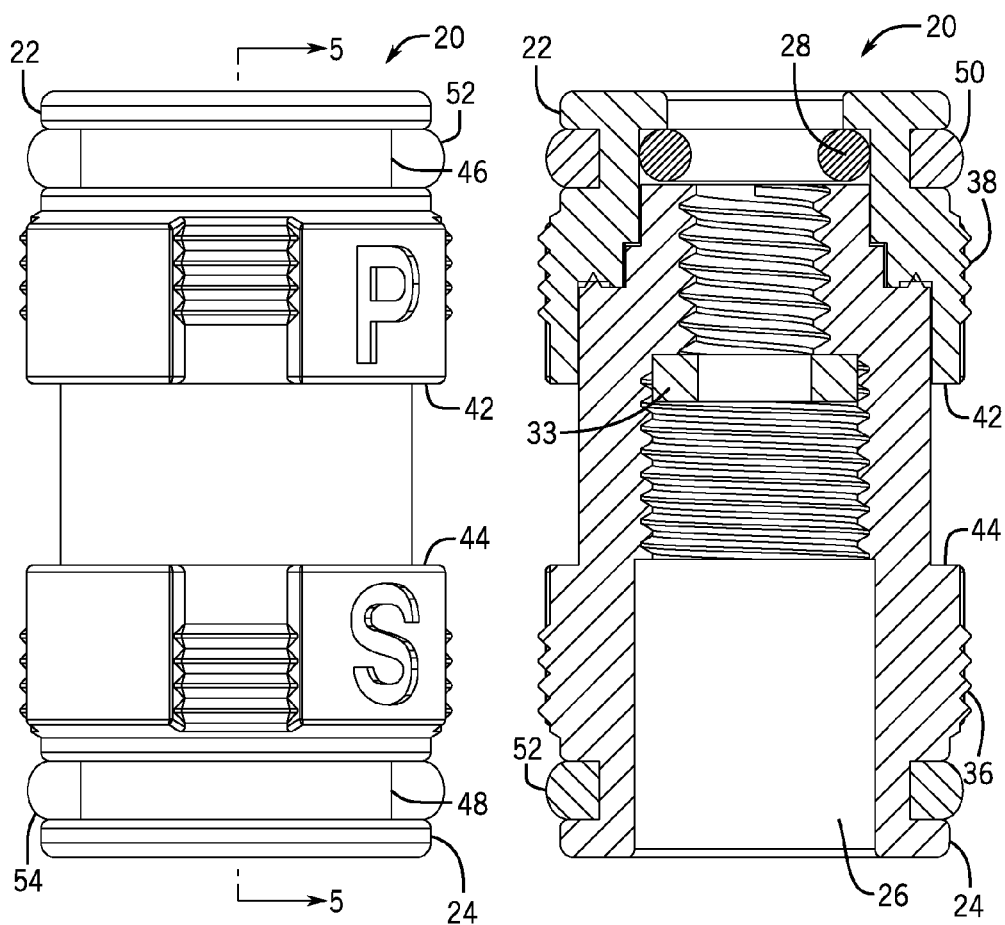
FIG. 4 is an elevation view of the adapter of FIG. 3.
FIG. 5 is a side cross-section of the adapter of FIG. 3 taken along the line 5-5 in FIG. 4.

As shown in FIGS. 3-10B, an adapter 20 can be created or shaped such that each end fits onto or can receive a different valve type. For example, in the embodiments shown in FIGS. 3-10B, the adapter 20 has a first open end 22 for a Presta valve and a second open end 24 for a Schrader valve. While the adapter 20 is shown having ends configured to connect to a Schrader valve 10 and a Presta valve 12, the adapter 20 could have ends configured to connect to other types of valves. Each end 22, 24 of the adapter 20 could be marked to provide quick reference as to which end fits with a valve type. For example, as seen in FIGS. 3 and 5, each end of the adapter 20 could be marked with a letter representing the valve type, e.g. 'P' for Presta, 'S' for Schrader, etc. The ends 22, 24 of the adapter 20 could also be color coded, e.g. red for the Schrader end 24, black for the Presta end 22, etc.

Figure 7:
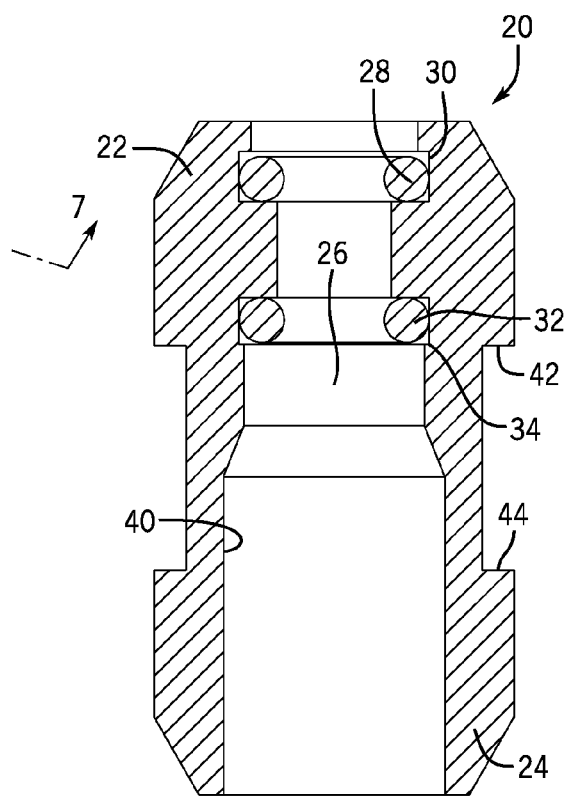
FIG. 7 is a side cross-section of the adapter of FIG. 6 taken along the line 7-7.
Figure 8:
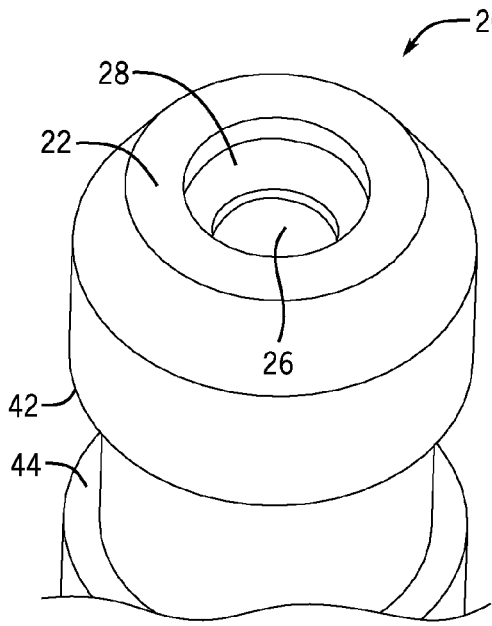
FIG. 8 is an end perspective view of the adapter of FIG. 6 showing the Presta valve connection end of the adapter.
Figure 9:
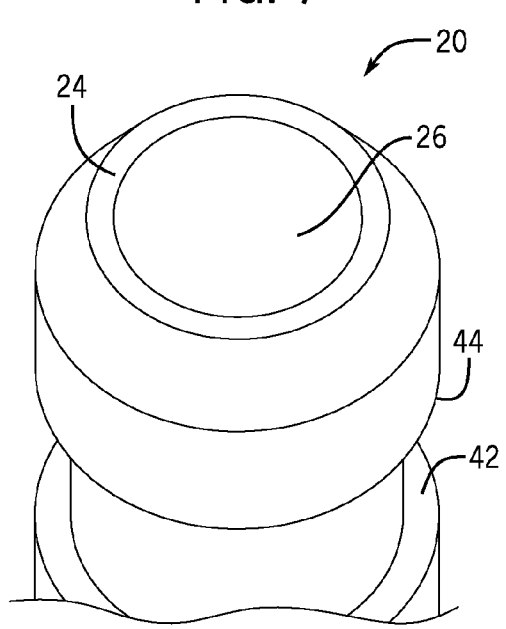
FIG. 9 is an end perspective view of the adapter of FIG. 6 showing the Schrader valve connection end of the adapter.

As seen in FIGS. 5 and 7, the adapter 20 is a hollow member with an internal air passage 26 between each end 22, 24 that allows air to move from one end of the adapter to the other. The air passage 26 of the adapter 20 can include O-rings to help create a seal between the adapter and the valve. For example, in the embodiment shown in FIG. 7, the air passage 26 of the adapter 20 has a first O-ring 28 seated in a first O-ring groove 30 to create a seal with the Presta valve 12 and a second O-ring 32 seated in a second O-ring groove 34 to create a seal with the top edge of the Schrader valve 10. In the adapter embodied in FIG. 5, the first O-ring 32 is seated between the base portion 36 and top portion 38 of the adapter to create a seal with the Presta valve 12. There is also a gasket or other sealing member 33 inside the adapter 20 to create a seal with the Schrader valve 10.

Figure 6:
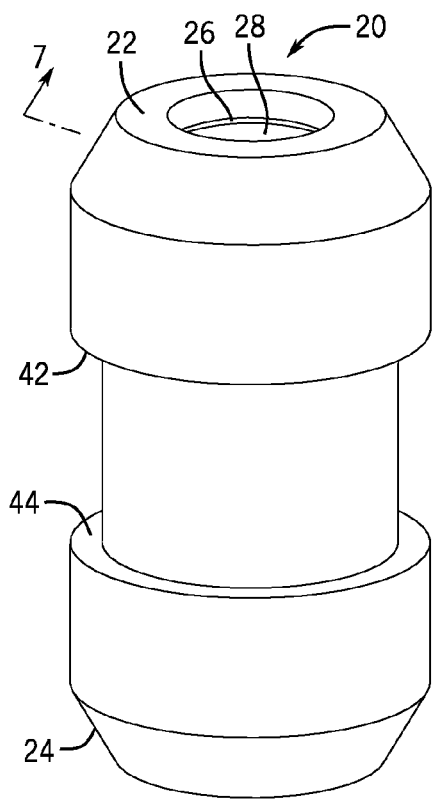
FIG. 6 is a side perspective view of another embodiment of an adapter in accordance with one embodiment of the invention.

The adapter 20 may be manufactured from plastic, metal, or other material that is sufficiently strong so as to maintain a shape and engagement to the valves, and sufficiently durable so as to be able to be left in place for a substantial time period while the bicycle or other device is in active use. Further, the adapter 20 may be integrally formed as shown in FIGS. 6-7 or be formed from parts. For example, as most easily seen in FIG. 5, the adapter 20 can be formed from a base portion 36 and a top portion 38 that are connected such as through the engagement of threads, gluing, bonding or welding, for example.

In the integrally formed adapter embodiment shown in FIGS. 6-9, the O-ring 28 must be inserted into the end 22 of the internal air passage 26 until it reaches the O-ring groove 30 in which it is seated. The second O-ring 32 must similarly be inserted into the end 24 of the internal air passage 26 until it reaches the O-ring groove 34 in which it is seated. The multi-part embodiment shown in FIGS. 3-5 allows the first O-ring 28 to be more easily placed into position on top of base portion 36, as seen in FIG. 4, before the top portion 38 is attached thereto, thereby capturing the O-ring.

Figure 10A:
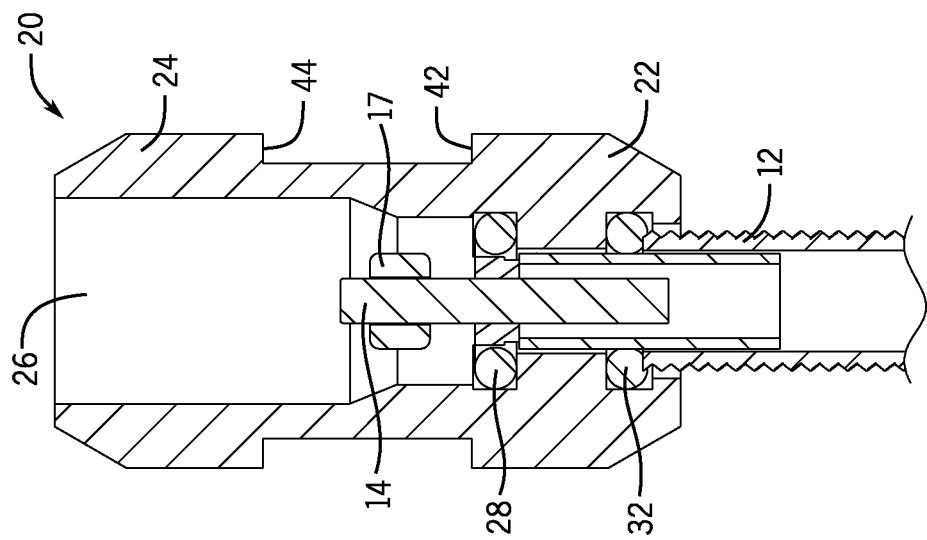
FIG. 10A is a cross-section view of the adapter of FIG. 3 connected to a Schrader valve.
Figure 10B:
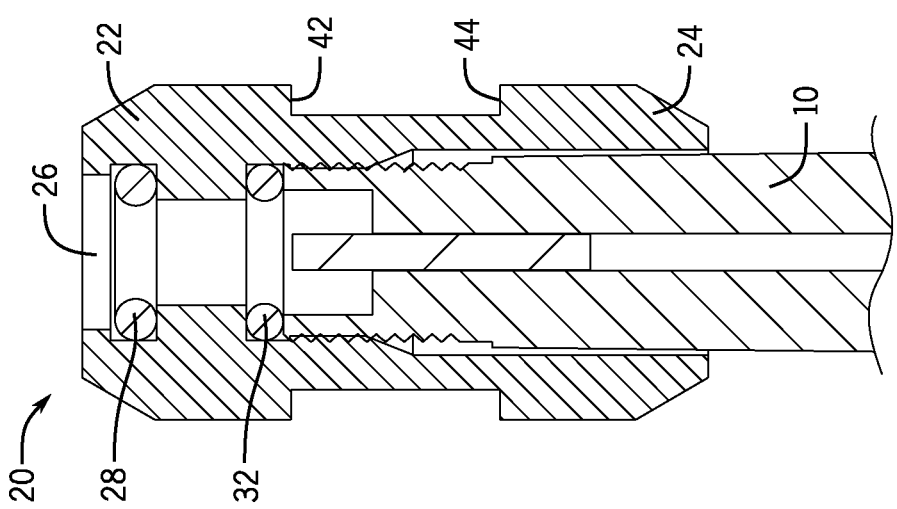
FIG. 10B is a cross-section view of the adapter of FIG. 3 connected to a Presta valve.
Figure 13:
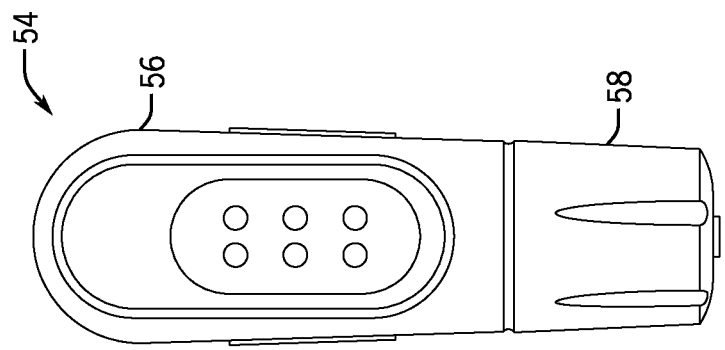
FIG. 13 is a rear elevation view of the attachment head of FIG. 11.
Figure 12:
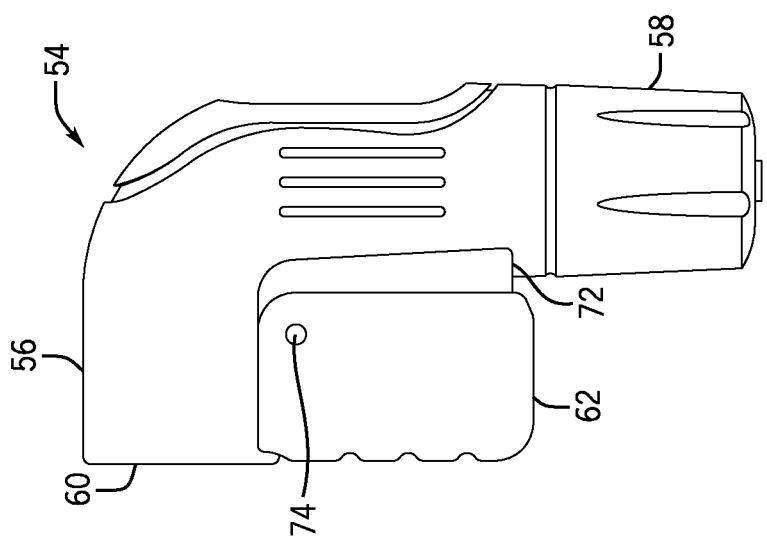
FIG. 12 is a side elevation view of the attachment head of FIG. 11.
Figure 11:
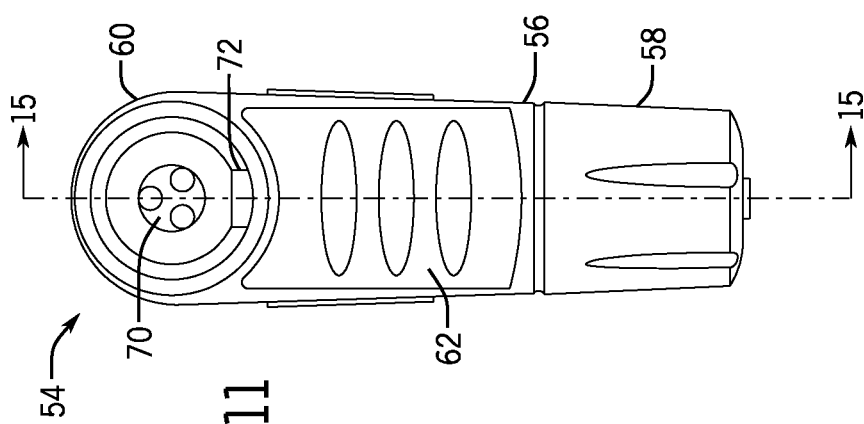
FIG. 11 is a front elevation view of one embodiment of an attachment head in accordance with one embodiment of the invention.

The embodiment shown in FIG. 10A is illustrated connected to a Schrader valve 10. FIG. 10B shows the adapter 20 connected to a Presta valve 12. The adapter 20 can be attached to a valve in any number of known ways. For example, the adapter 20 can have an air passage 26 with smooth bore 40, as seen most easily in FIG. 7, wherein the adapter is easily slid onto a valve and held by a friction fit. Alternatively, the air passage 26 can be threaded, as seen in FIG. 5, sized to match and receive the threaded portion 16 of a valve, in this embodiment a Presta valve 12 on one end 22 of the adapter and a Schrader valve 10 on another end 24. The threaded engagement of the embodiment shown in FIG. 5 allows the adapter 20 to be securely held to the valve, creates a better seal with the valve and eliminates the need to take off, put on and otherwise keep track of a valve cap. A threaded engagement permits the adapter 20 to remain on the valve during use of the object to which the valve is attached, for example a bicycle. Keeping the adapter 20 on the valve is more convenient and reduces down time, for example, if a bicycle tire needs to be inflated during a race.

Once the adapter 20 is connected to a valve, the adapter can then be connected or secured to an attachment head as described below. The exterior shape of the adapter 20 and/or the ends 22, 24 of the adapter can be made to promote a secure and sealing engagement by the attachment head. For example, as best seen in FIGS. 3-10B, the adapter 20 can include exterior engagement edges or rims 42, 44 that are used in securing the adapter 20 to an attachment head. In one embodiment, the adapter 20 also has an external groove 46, 48 located at each end, 22, 24 for exterior O-rings 50 and 52 or sealing members respectively. As will be described, the external O-rings 50, 52 help form a seal with the attachment head to facilitate air transfer from the air source, through the conduit of the attachment head through the air passage 26 of the adapter 20 and into the valve.

The attachment head is capable of connecting to the adapter and an air source and for depressing the pin 14 of a valve such that air may be moved from the air source and into the valve. For example, the attachment head could be incorporated into the end of a pump, air compressor or a hose from a pump or air compressor, or a container of compressed gas, such as for emergency flats. The attachment head may also have a common means for connecting the attachment head to a variety of sources, e.g. threads, such as to retrofit an air source to use such an attachment head. The attachment head may also have the ability to release air from the valve and adapter 20, such as if the object is over-inflated. Although, each of the ends 22, 24 of the adapter 20 could be shaped differently, having each of the ends shaped the same allows the attachment head to be shaped such that it needs to only fit one end shape. Further, a variety of adapters could be designed to fit any number of valve types and if each of the ends are shaped the same, a single attachment head could be used.

FIGS. 11-15 illustrate different views of one embodiment of an attachment head or nozzle 54. In the embodiment shown in FIGS. 11-15, the attachment head 54 has a body 56. In the embodiment shown in FIGS. 11-15, the body 56 is formed as a single piece of molded plastic, but could also be designed in multiple parts or from other materials for manufacturing convenience. One end of the body 56 can have an air port 58 for connecting the attachment head 54 to an air supply such as a hand pump, air compressor or the supply hose thereof. Another end of the body 56 can have an adapter port or dock 60 to connect the attachment head 54 to the adapter 20. The attachment head 54 also includes a conduit 55 connecting the air port 58 to the adapter port 60. The attachment head 54 may also include a way to release the attachment head from the adapter 20 such as by a release mechanism, which in FIGS. 11-15 is a release button or switch 62.

Figure 15:
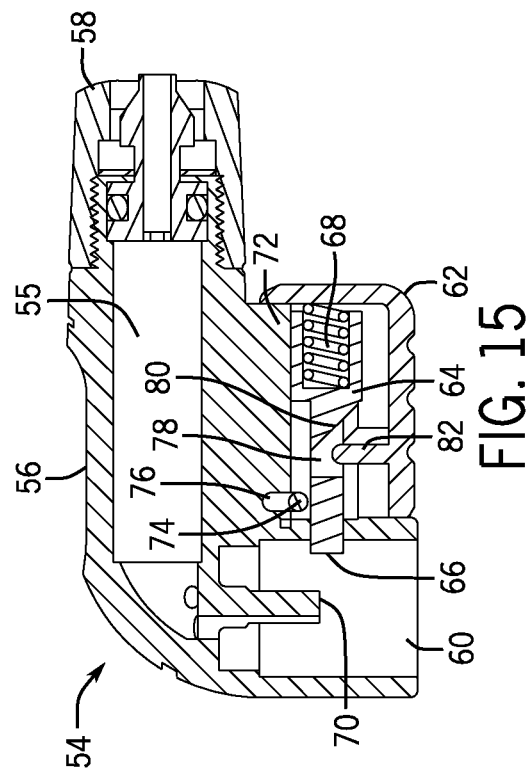
FIG. 15 is a cross-section view of the attachment head of FIG. 11 taken along the line 15-15 in accordance with one embodiment of the invention.
Figure 14:
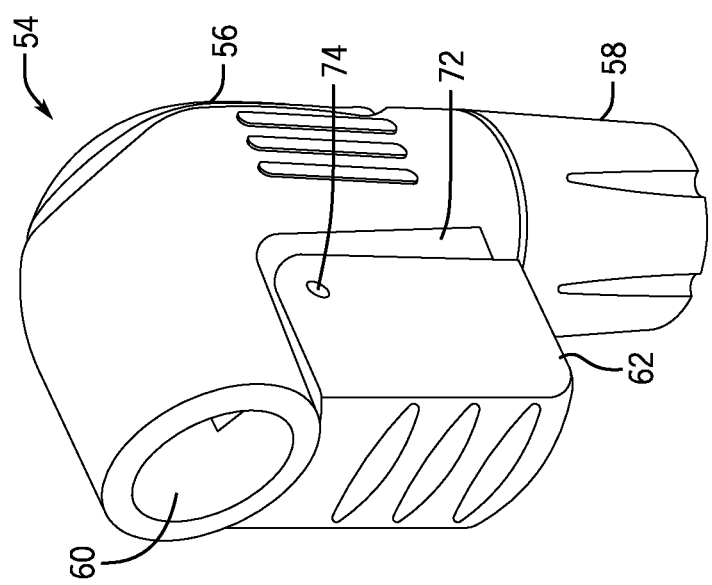
FIG. 14 is a side perspective view of the attachment head of FIG. 11.

The attachment head 54 shown in FIGS. 11-15 also includes an engagement or lock mechanism for securing the attachment head to the adapter 20. As seen in FIG. 15, internally, the attachment head may have a slide plate 64. Although the slide plate can take many forms, in the embodiment shown in FIG. 15, the slide plate has a lock arm or end 66 that is biased to extend into the adapter port 60 by a spring 68. When an adapter 20 is inserted into the adapter port 60, the adapter urges the lock arm 66 away from the adapter port when the force used to insert the adapter or to push the attachment head on the adapter, overcomes the force exerted by the spring 68 on the slide plate. When the adapter is inserted far enough into the adapter port 60 that one of the engagement rims, 42, 44 passes the lock arm 66, the force exerted by the spring 68 on the slide plate 64, will bias the lock arm back into the adapter port and hold the adapter in the adapter port by the engagement rim. The spring 68 is held in position by a spring retainer 92.

The shape and size of the adapter port 60 guides the adapter 20 and/or attachment head 54 into proper alignment such that the adapter and attachment head engage properly and form a seal. The lock arm 66 essentially clicks into place to retain the adapter 20 when the adapter is fully inserted into the adapter port 60 to maintain the seal. Therefore, the user is not required to create a proper seal through trial and error of different angles and positions of the attachment head 54 as is the case for many prior art devices. Furthermore, the user is not required to exert a large amount of force rotating a cam into a locked position.

Figure 16:
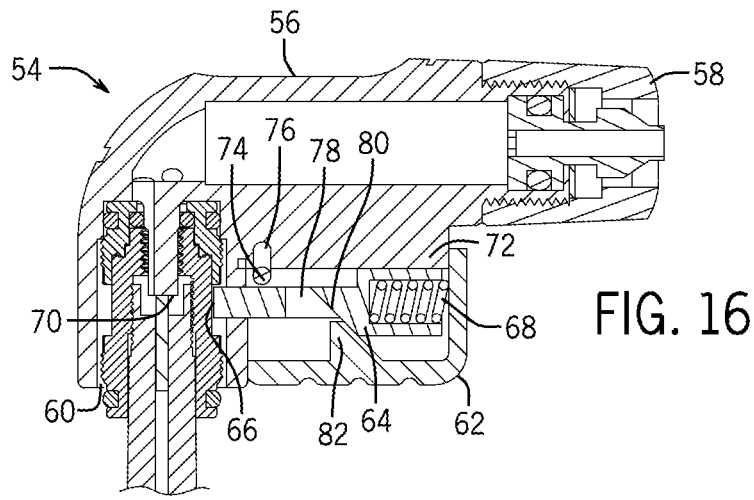
FIG. 16 is a cross-section view of the attachment head of FIG. 11 taken along the line 15-15 in FIG. 11, shown engaged with an adapter connected to a Schrader valve.
Figure 17:
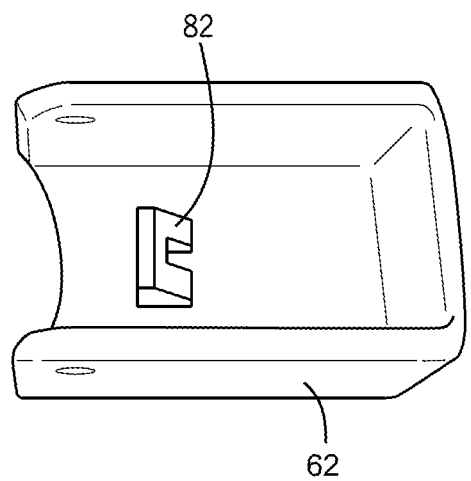
FIG. 17 is a perspective view of the release button of the attachment head of FIG. 11.
Figure 18:
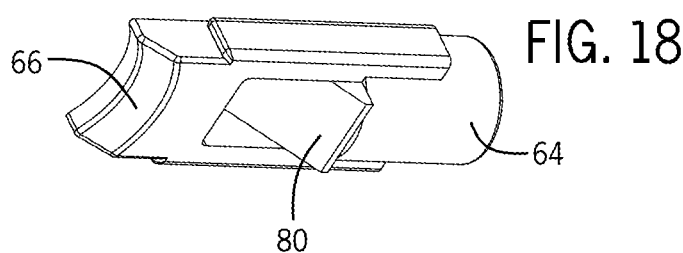
FIG. 18 is a perspective view of the slide plate of the attachment head of FIG. 11.
Figure 19:
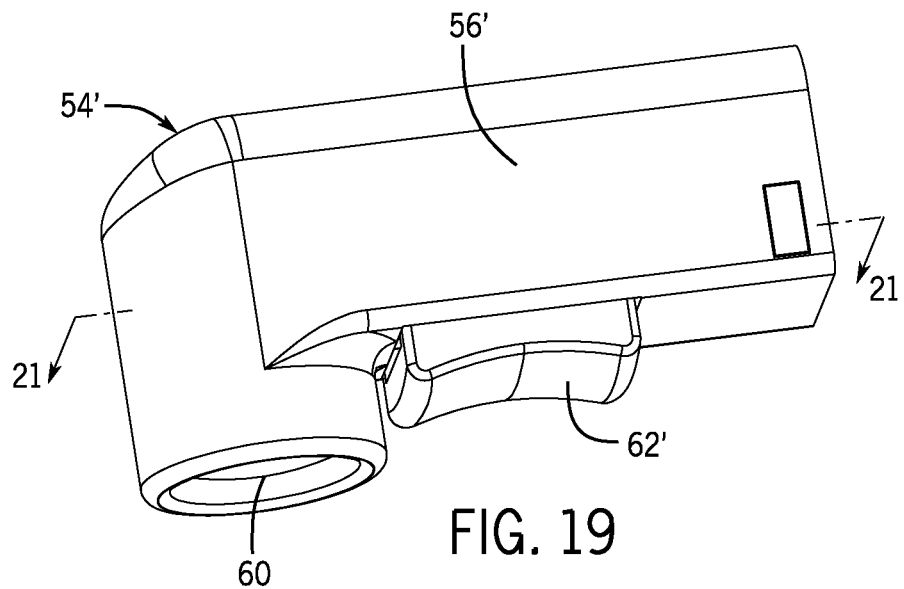
FIG. 19 is a side perspective view of another embodiment of an attachment head in accordance with one embodiment of the invention.
Figure 20:
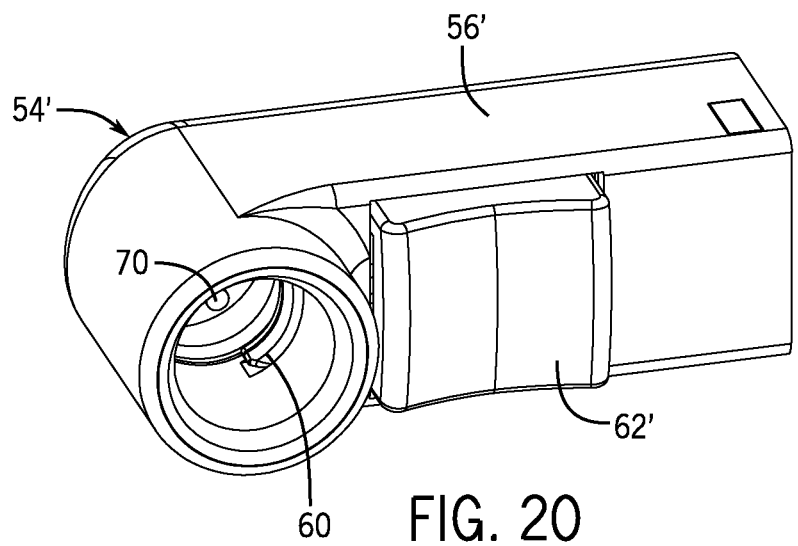
FIG. 20 is a bottom perspective view of the attachment head of FIG. 19.

As the adapter 20 is inserted into the adapter port 60, a pin activator 70 will engage the pin 14 of the valve attached to the adapter. When the adapter 20 is fully inserted into the adapter port 60, the pin activator 70 will depress the pin 14 to allow air to move into or out of the valve. Further, in one embodiment, one of the exterior O-rings 50, 52, depending on which end 22, 24 is inserted into the adapter port 60 respectively, will form a seal with the adapter port when the adapter is fully inserted in the adapter port as seen in FIG. 16. The seal ensures that the air transmitted through the attachment head 54 enters the adapter 20 and is not otherwise leaked.

The release mechanism or release button 62 can cooperate with the slide plate 64 to release the adapter 20 such that the adapter can be removed from the adapter port 60. In the embodiment shown in FIG. 15, the release button 62 fits around an extension 72 of the body 56. The release button 62 is connected to the body 56 by a spindle 74 that extends through a first side of the release button then through a slot 76 in the extension 72 and then through the second side of the release button. The other end of the release button 62 fits snugly around the extension 76. When the release button 62 is depressed, the release button causes the spindle 74 to ride up the slot and the other end of the release button to slide along and be guided by the extension 72.

In the embodiment shown in FIG. 15, the slide plate 64 has an opening 78 formed therein and a ramp or angled portion 80 at one end of the opening. The release button 62 has a projection 82 such that when the release button is depressed, the projection 82 will contact the ramp 80. When the force applied to the slide plate 64 from the release button 62 through the contact between the ramp 80 and projection 82 is sufficient to overcome the force exerted on the slide plate by the spring 68, the slide plate will move. Because the ramp 80 shown in the embodiment seen in FIG. 15 is angled, the further the release button 62 is depressed, the further the slide plate will move away from the adapter port 60. As the slide plate 64 moves, the lock arm 66 of the slide plate is withdrawn from the adapter port 60 and, if an adapter 20 is in the adapter port, out of engagement with the engagement rim 42 or 44. When the lock arm 66 is completely withdrawn from the adapter port 60, the adapter 20 is released from the adapter port and can be removed from the attachment head 54. The opening 78 in the slide plate 64 allows the projection 82 to extend through the slide plate as the release button 62 is further depressed and allows the lock arm to be urged out of the adapter port 60 by the adapter 20 without being obstructed by the projection 82.

An alternative attachment head embodiment is shown in FIGS. 19-29. In the alternative attachment head embodiment, the adapter port 60 of the attachment head 54' has an O-ring groove 84 for retaining O-ring 86 as is most easily seen in FIGS. 21-22. When an adapter 20 without exterior O-rings, as seen in FIGS. 6-9, is inserted into the adapter port 60 of the attachment head shown in FIGS. 21-22, the O-ring 86 creates a seal with one of the adapter ends 22, 24, depending on which end is inserted into the adapter port. The seal ensures that the air transmitted through the attachment head 54' enters the adapter 20 and is not otherwise leaked. Having at least one O-ring 86 inside the adapter port 60 removes the need to have two external O-rings 50, 52 on the adapter 20, which can be cheaper to manufacture, and reduce the possibility that the external O-rings get damaged or dirty from being used, such as when riding a bicycle through mud, which could make creating a seal difficult.

Figure 21:
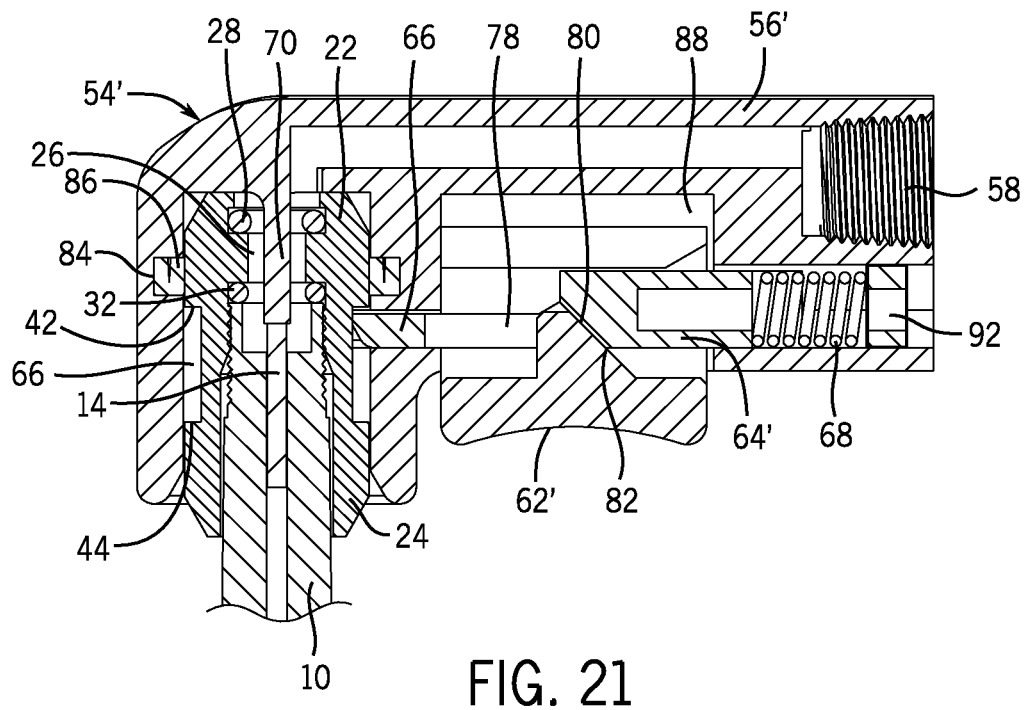
FIG. 21 is a side cross-section showing the attachment head of FIG. 19 taken along the line 21-21 in FIG. 19, shown engaged with an adapter connected to a Schrader valve.
Figure 22:
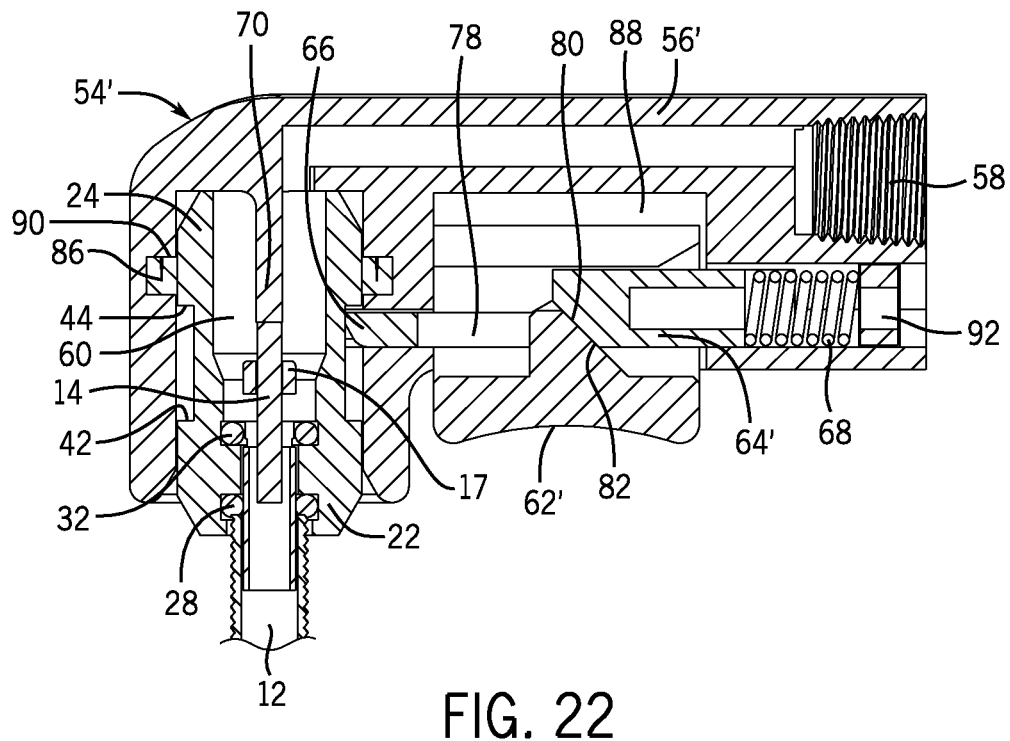
FIG. 22 is a side cross-section showing the attachment head of FIG. 19 taken along the line 21-21 in FIG. 19, shown engaged with an adapter connected to a Presta valve.

The attachment head 54' shown in FIGS. 19-29 also has a release button 62' which fits inside a cavity 88 of the body 56'. A more detailed view of the cavity 88 can be seen in FIGS. 28-29, which illustrate the attachment head 54' without the release button 62' or slide plate 64'. As seen in FIGS. 21-22, the cavity 88 is slightly larger than the release button 62' when the release button is in its un-depressed state, so that when the release button is depressed it can slide upward, further into the cavity.

Figure 23:
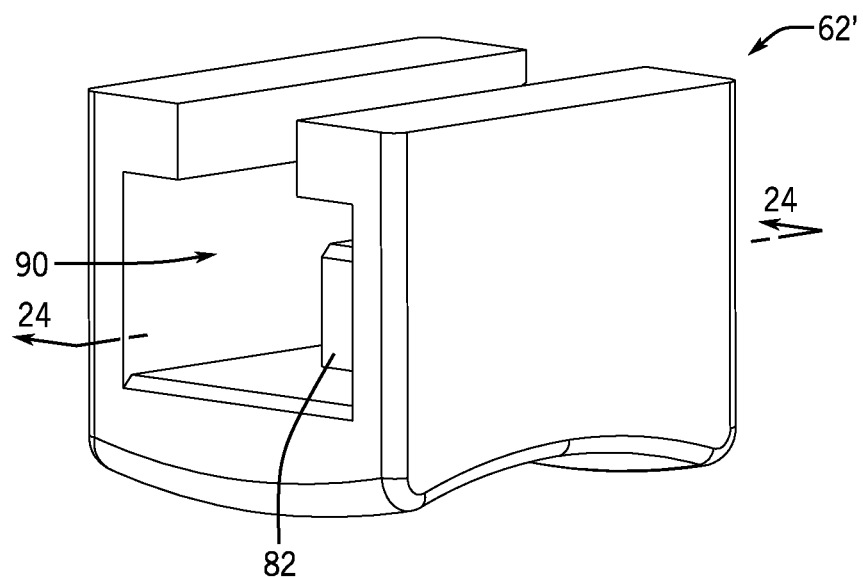
FIG. 23 is a side perspective view of the release button of the attachment head of FIG. 19.
Figure 24:
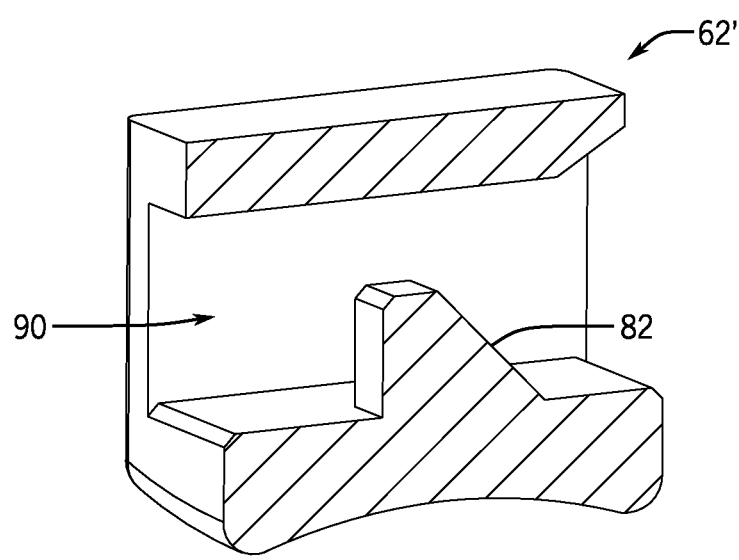
FIG. 24 is a side perspective cross-section of the release button of FIG. 23 taken along the line 24-24 in FIG. 23.
Figure 25:
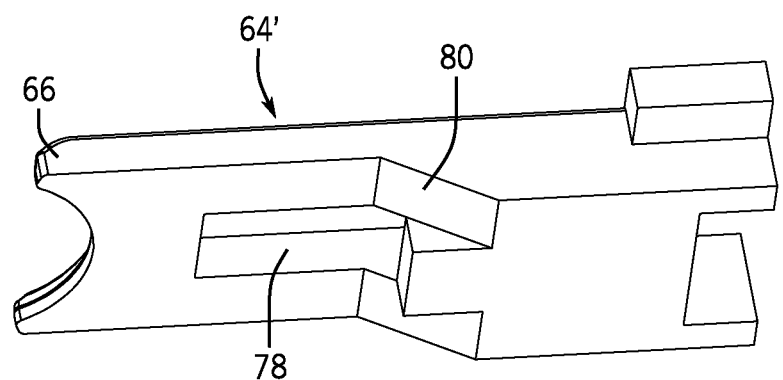
FIG. 25 is a bottom perspective view of the slide plate of the attachment head of FIG. 19.
Figure 26:
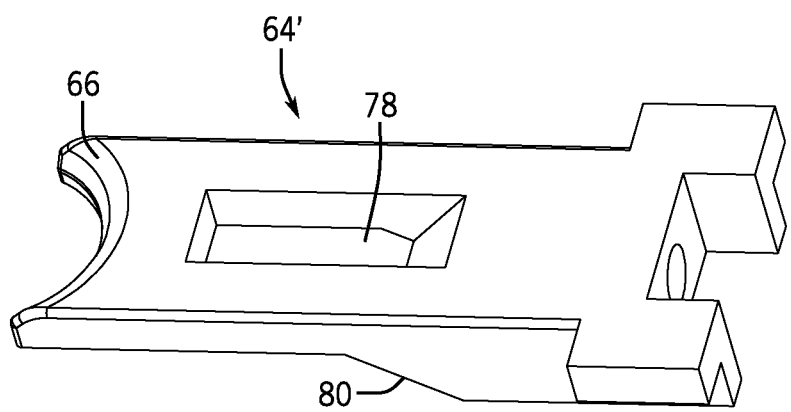
FIG. 26 is a top perspective view of the slide plate of FIG. 25.
Figure 27:
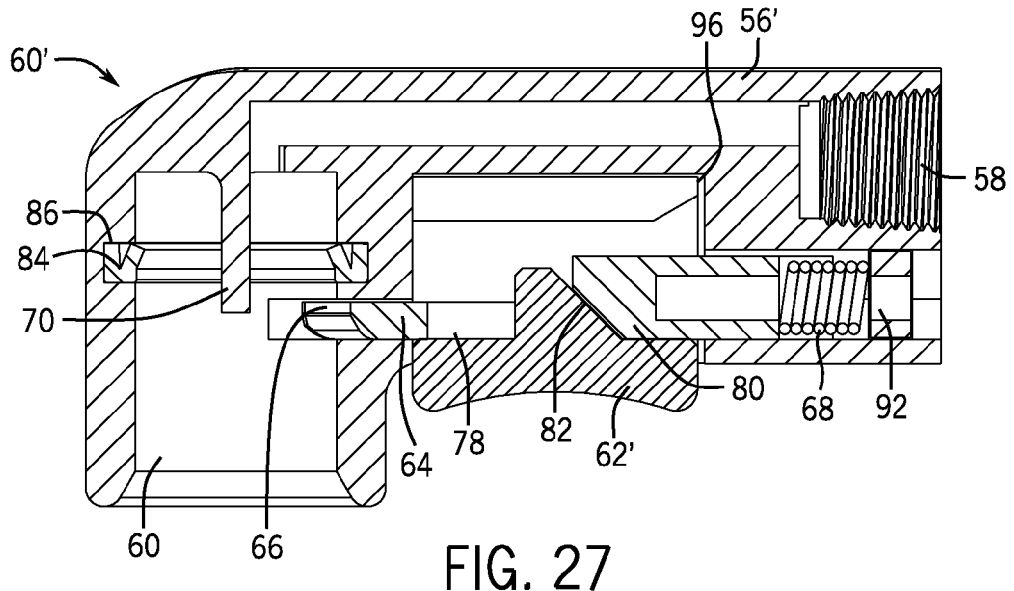
FIG. 27 is a side cross-section of the attachment head of FIG. 19 with the release button depressed taken along the line 21-21 in FIG. 19.
Figure 28:
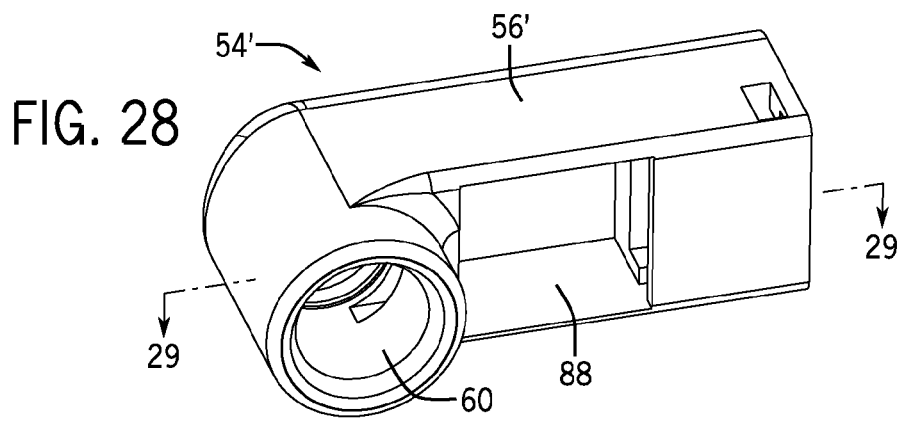
FIG. 28 is a bottom perspective view of the attachment head of FIG. 19, shown with select internal parts removed.
Figure 29:
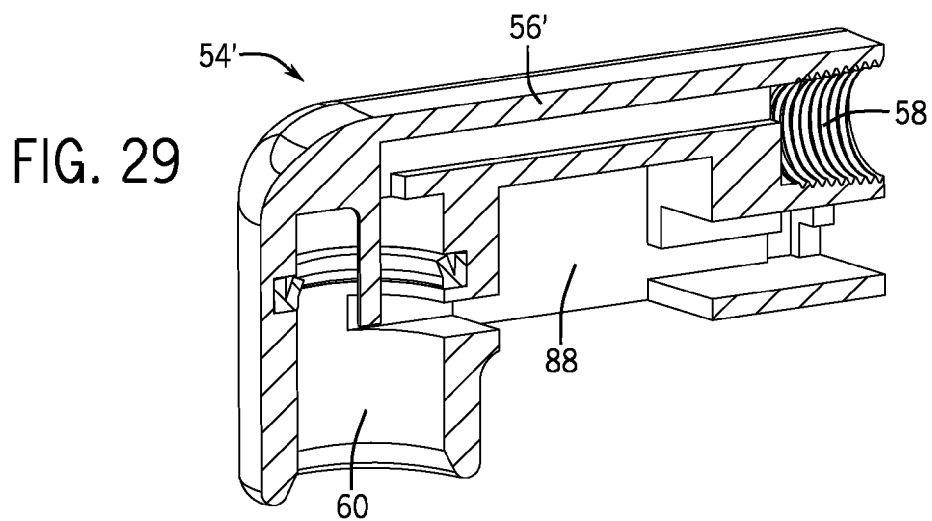
FIG. 29 is a side perspective cross-section of the attachment head of FIG. 28 taken along the line 29-29 in FIG. 29.

A more detailed view of the release button 62' can be seen in FIGS. 23-24. The release button 62' has a box like body with a niche 90 extending there through. A more detailed view of the slide plate 64' can be seen in FIGS. 25-26. In the embodiment shown in FIGS. 25-26, the slide plate 64' has a lock arm 66 with a curved end that generally matches the shape of the adapter 20, an opening 78 and a ramp 80. When the release button 62' is not depressed, as seen in FIGS. 21-22, the slide plate 64' fits between the top of the niche 90 and the top of the projection 82 and is held from moving vertically by the body 56'. As the release button 62' is depressed, the angled surfaces of the projection 82 and ramp 80 slide in opposite directions when the force applied to the release button overcomes the force exerted on the slide plate 64' by the spring 68 because the lock plate cannot move vertically. As the projection 82 and ramp 80 slide in opposite directions, as seen in FIG. 27, the slide plate 64' is forced to slide away from the adapter port 60, thereby withdrawing the lock arm 66 from the adapter port. As the projection 82 and ramp 80 slide in opposite directions, the release button 62' extends further into the opening 78 and further into the cavity 88.

Figure 30A:
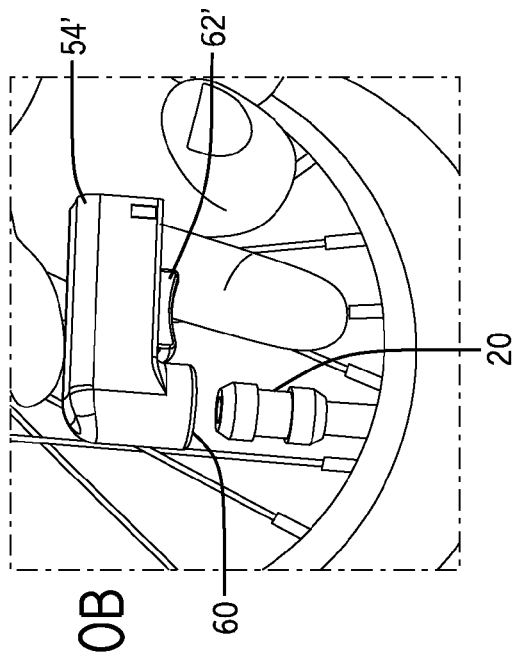
FIG. 30A is a perspective view of the adapter of FIG. 6 attached to a valve.
Figure 30B:
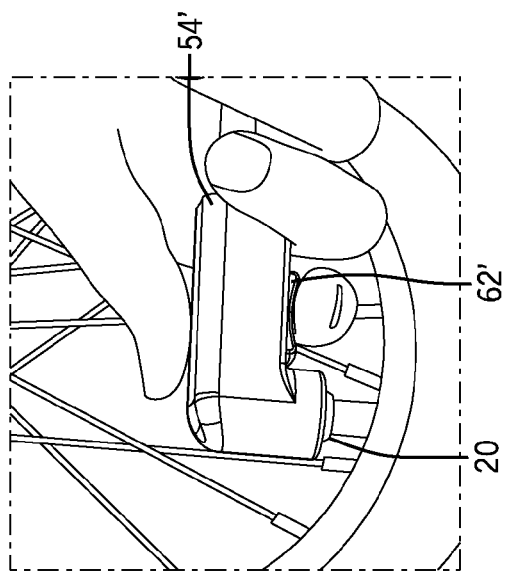
FIG. 30B is a perspective view of the attachment head of FIG. 19 being attached to the adapter.
Figure 30C:
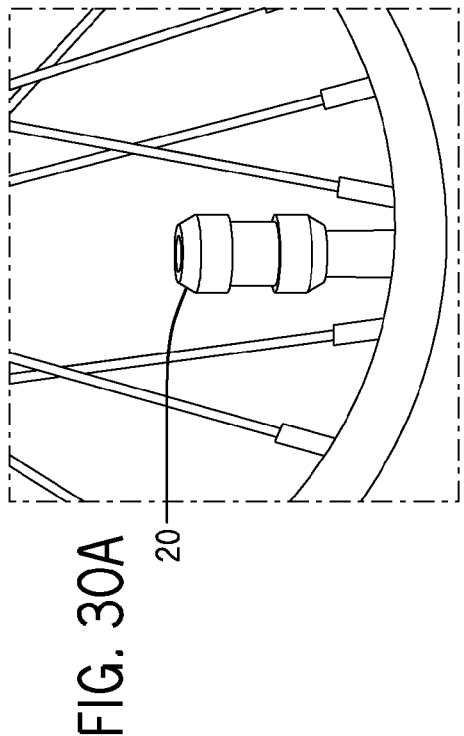
FIG. 30C is a perspective view of the attachment head of FIG. 19 attached to the adapter.
Figure 30D:
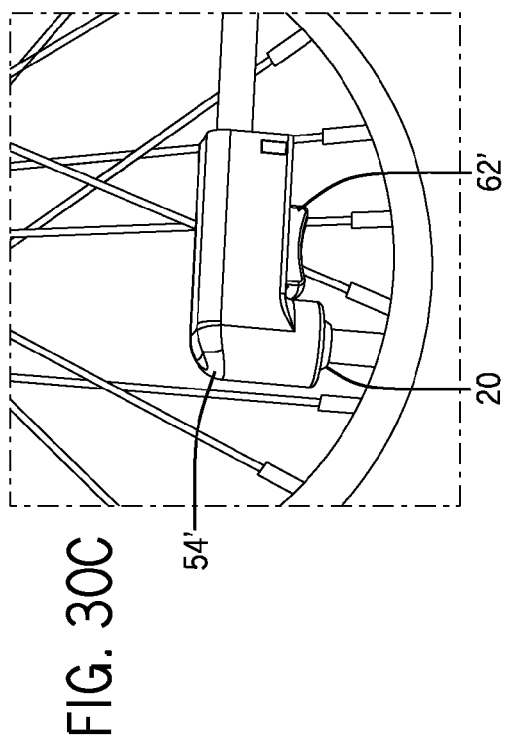
FIG. 30D is a perspective view of the attachment head of FIG. 19 being disengaged from the adapter.

FIGS. 30A-D illustrate the process of attaching an adapter 20 to a valve, placing the attachment head 54' onto the adapter, and releasing the attachment head from the adapter by depressing the release button 62'. In FIG. 30A, the adapter 20 has been placed and/or secured onto a valve. In FIG. 30B, a user is placing the attachment head 54' onto the adapter 20 by lining the adapter up with the adapter port 60. In FIG. 30C, the attachment head is shown engaged with the adapter and ready for air to be delivered from the air source to the tire. In FIG. 30D, the user is beginning to depress the release button 62' in order to remove the attachment head 54' from the adapter 20. Because the pin activator 70 is depressing the pin 14 of a valve allowing air to move to or from the tire, when the lock arm 66 is withdrawn from the adapter port 60 and the engagement rim 42 or 44, the pressure inside the tire or inflated object will cause a little air to escape the tire and help separate the attachment head from the adapter to further ease removal.

Another embodiment is shown in FIGS. 31-33, wherein the release button 62" is positioned at the top of the attachment head 54". In the embodiment shown in FIGS. 31-33, the release button 62" and slide plate 64" cooperate and have similar functioning to that described with respect the attachment head 54' above with slightly different configurations, e.g. flipped such that the release button 62" extends out of the top of the attachment head 54" rather than the bottom. For example, the ramp 82 of the release button 62" interacts with a slide plate 64" to cause the lock arm 66 to be withdrawn from the adapter port 66 when the release button is depressed.

Figure 34B:
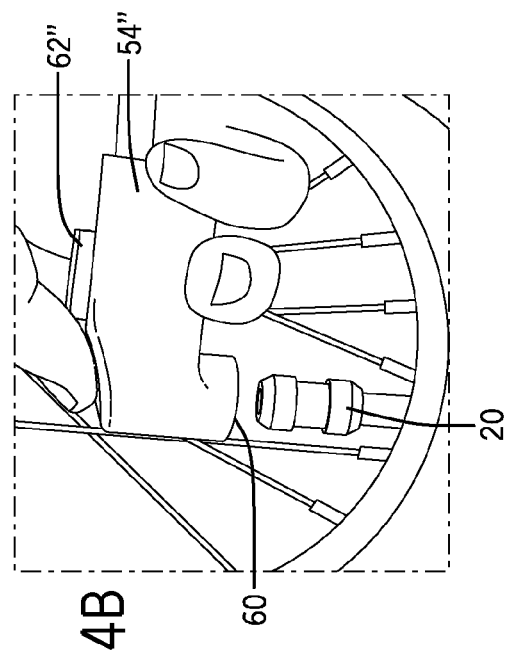
FIG. 34B is a perspective view of the attachment head of FIG. 31 being attached to the adapter.
Figure 34D:
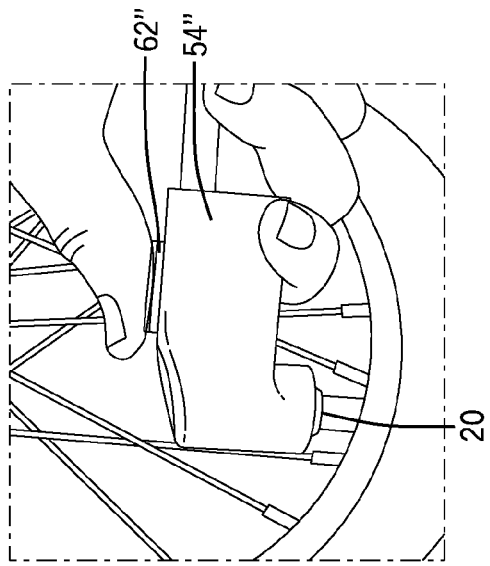
FIG. 34D is a perspective view of the attachment head of FIG. 31 being disengaged from the adapter.
Figure 34A:
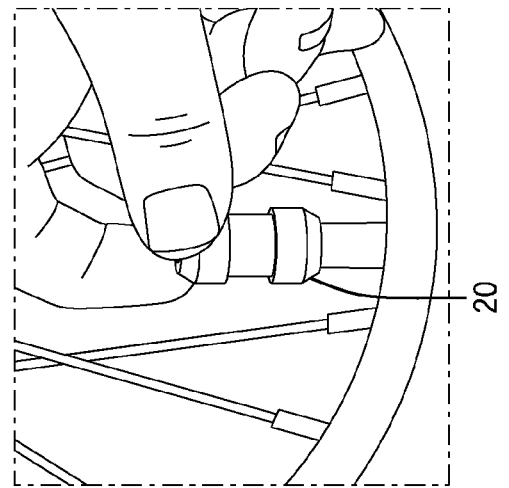
FIG. 34A is a perspective view of the adapter of FIG. 6 being attached to a valve.
Figure 34C:
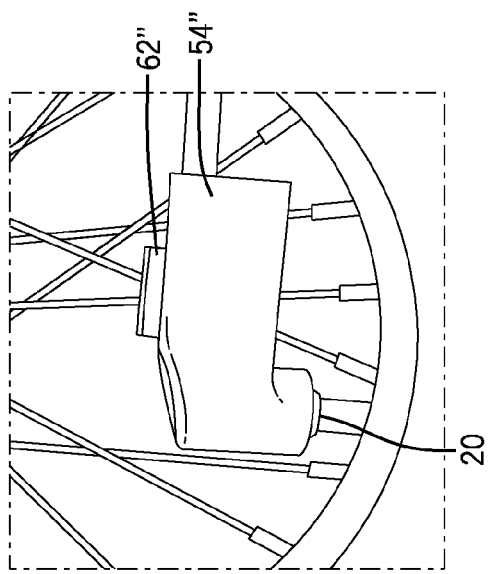
FIG. 34C is a perspective view of the attachment head of FIG. 31 attached to the adapter.

FIGS. 34A-D illustrate the process of attaching an adapter 20 to a valve, placing the attachment head 54" onto the adapter, and releasing the attachment head from the adapter by depressing the release button 62". In FIG. 34A, a user is putting the adapter 20 onto a valve. In FIG. 34B, a user is placing the attachment head 54" onto the adapter 20 by lining the adapter up with the adapter port 60. In FIG. 34C, the attachment head 54" is shown engaged with the adapter and ready for air to be delivered from the air source to the tire. In FIG. 34D, the user is beginning to depress the release button 62" in order to remove the attachment head 54" from the adapter 20.

Additional alternative embodiments of the attachment head could be readily designed by one of skill in the art. For example, alternative configurations for the release button and its interaction with the slider plate could be designed. Or a sliding style release button that is even formed as a unitary piece with the slider plate could be designed. For example, in FIG. 35, an embodiment is shown wherein a trigger 100 is integrally formed with the slide plate 64''' of the attachment head 54''' and body 56'''. Thus when the trigger is pulled, the spring 68 is compressed, and the lock arm 66 is withdrawn from the adapter port 60 and disengaged from the adapter.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A pump comprising:
    an adapter further comprising:
        a first open end having an interior portion shaped to connect to a valve and an exterior;
        a second open end having an interior portion shaped to connect to a valve and an exterior;
        an internal passage connecting the first open end to the second open end; and
        an external shape having at least one engagement rim; and
    an attachment head comprising:
        a port shaped to receive the exterior of at least one of the first open end and second open end;
        a slide plate having an arm urged into the port by a spring and having an angled portion;
        a release button having a projection for engaging the angled portion to push the slide plate against the bias of the spring so as to withdraw the arm from the port;
        an internal conduit providing the attachment head with an air supply; and
    wherein the arm engages the at least one engagement rim of the adapter when at least one of the first open end and second open end is received in the port to hold the adapter within the port; and
    wherein the adapter is released from the port when the release button is depressed to withdraw the arm from engagement with the at least one engagement rim of the adapter.

2. The pump of claim 1, wherein the interior portion of each of the first open end and the second open end connects to the valve by one of a group consisting of a friction fit and a threaded fit.

3. The pump of claim 1, wherein the attachment head further comprises a pin activator that opens a valve by depressing a pin of the valve when one of the first open end and second open end is received in the port.

4. The pump of claim 1, wherein the port includes a sealing member such that a seal is formed between the adapter and the attachment head when one of the first open end and second open end is received in the port.

* * * * *